United States Patent
Iwamura

(10) Patent No.: US 7,813,842 B2
(45) Date of Patent: Oct. 12, 2010

(54) SYSTEMS AND METHODS FOR USE IN PROVIDING LOCAL POWER LINE COMMUNICATION

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 16 days.

(21) Appl. No.: 11/373,616

(22) Filed: Mar. 9, 2006

(65) Prior Publication Data
US 2007/0213879 A1 Sep. 13, 2007

(51) Int. Cl.
*G05D 11/00* (2006.01)
(52) U.S. Cl. .................. 700/292; 700/293; 324/424; 324/522; 307/31
(58) Field of Classification Search .......... 700/292, 700/293; 324/522, 424; 307/31
See application file for complete search history.

(56) References Cited

U.S. PATENT DOCUMENTS

| | | | | |
|---|---|---|---|---|
| 4,272,687 A | * | 6/1981 | Borkan | 307/115 |
| 5,270,658 A | * | 12/1993 | Epstein | 324/424 |
| 6,084,758 A | * | 7/2000 | Clarey et al. | 361/62 |
| 6,292,717 B1 | * | 9/2001 | Alexander et al. | 700/293 |
| 6,356,426 B1 | * | 3/2002 | Dougherty | 361/102 |
| 6,654,216 B2 | * | 11/2003 | Horvath et al. | 361/65 |
| 6,828,695 B1 | * | 12/2004 | Hansen | 307/31 |
| 2005/0015805 A1 | * | 1/2005 | Iwamura | 725/79 |
| 2005/0040809 A1 | * | 2/2005 | Uber et al. | 324/117 R |
| 2006/0119368 A1 | * | 6/2006 | Sela et al. | 324/522 |
| 2006/0267409 A1 | * | 11/2006 | Mullet et al. | 307/64 |

\* cited by examiner

*Primary Examiner*—Albert DeCady
*Assistant Examiner*—Tejal J Gami
(74) *Attorney, Agent, or Firm*—Fitch, Even, Tabin & Flannery

(57) ABSTRACT

The present embodiments provide systems and methods for implementing and controlling local power line communication (PLC) networks. Some embodiments include a central controller communicationally coupled with a PLC power line, a sensor adaptor coupled between the PLC power line and a consumer product, with the sensor adaptor comprising a current detector that detects a current usage level passed through the sensor adaptor, a PLC interface through which the current usage level is communicated over the PLC power line to the central controller, and an adaptor switch that interrupts current flow to the consumer product in response to a command received over the PLC power line from the central controller when the current usage through the sensor adaptor has a predetermined relationship to a first threshold.

8 Claims, 9 Drawing Sheets

_US 7,813,842 B2_

SYSTEMS AND METHODS FOR USE IN PROVIDING LOCAL POWER LINE COMMUNICATION

FIELD OF THE INVENTION

The present invention relates generally to power line networks, and more particularly to communicating over power line networks.

BACKGROUND

It has long been a desire to network multiple different products or entities to a single network. Establishing the communication links between these entities has presented some difficulty and is relatively costly. Further, it is often prohibitively complicated and costly to incorporate networking into simple systems such as homes and/or small businesses.

Some networking systems have attempted to employ the use of conventional power lines that deliver electrical power to consumer products as the network connectivity between entities, such as the consumer products. The use of the power lines as communication links, however, has presented some significant difficulties in implementation.

SUMMARY OF THE EMBODIMENT

The present embodiments advantageously addresses the needs above as well as other needs through the provision of the methods, apparatuses, and systems for use in establishing and/or controlling a local power line communication (PLC) network. Some embodiments provide a local PLC network that includes a central controller communicationally coupled with a local PLC power line; and a sensor adaptor coupled between the local PLC power line and a consumer product, the sensor adaptor comprising: a current detector that detects a current usage level passed through the sensor adaptor to the consumer product; a PLC interface through which the current usage level is communicated over the local PLC power line to the central controller; and an adaptor switch that is opened interrupting current flow to the consumer product in response to a command received over the local PLC power line from the central controller when current usage through the sensor adaptor has a predetermined relationship to a first threshold.

Some embodiments provide a PLC network that includes a plurality of sensor adaptors coupled with one of a plurality of local PLC power lines and one or more consumer products controlling current flow from the local PLC power lines to the corresponding one or more consumer products; a central controller coupled with a first local PLC power line of the plurality of local PLC power lines and in communication with the plurality of sensor adaptors over the plurality of local PLC power lines, the central controller comprises: a PLC interface coupled with the first local PLC power line; and a controller coupled with the PLC interface through which the controller transmits and receives PLC data signals, wherein the controller receives a plurality of current usage information over the plurality of local PLC power lines from the plurality of sensor adaptors, determines for each sensor adaptor whether the current usage information has a predetermined relationship with one of a plurality of first thresholds, generates one or more interrupt commands for one or more sensor adaptors with associated current usage information that has the predetermined relationship with one of the plurality of first thresholds, and communicates the one or more interrupt commands over the plurality of local PLC power lines; and the one or more sensor adaptors receive the one or more interrupt commands such that the one or more sensor adaptors interrupt power to the corresponding one or more consumer products.

Other embodiments provide a method of use in controlling power usage over a PLC. The method monitors a local current usage level of current received from a local power line communication (PLC) network and delivered to a consumer product; communicates the local current usage level over the local PLC network; receives the local current usage level from over the local PLC network at a central controller of the local PLC network; determines at the central controller whether there is a predetermined relationship between the local current usage level and a threshold; and communicates from the central controller an interrupt command over the local PLC network when there is a predetermined relationship between the local current usage level and the threshold.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present embodiments will be more apparent from the following more particular description thereof, presented in conjunction with the following drawings wherein.

Figure 1:
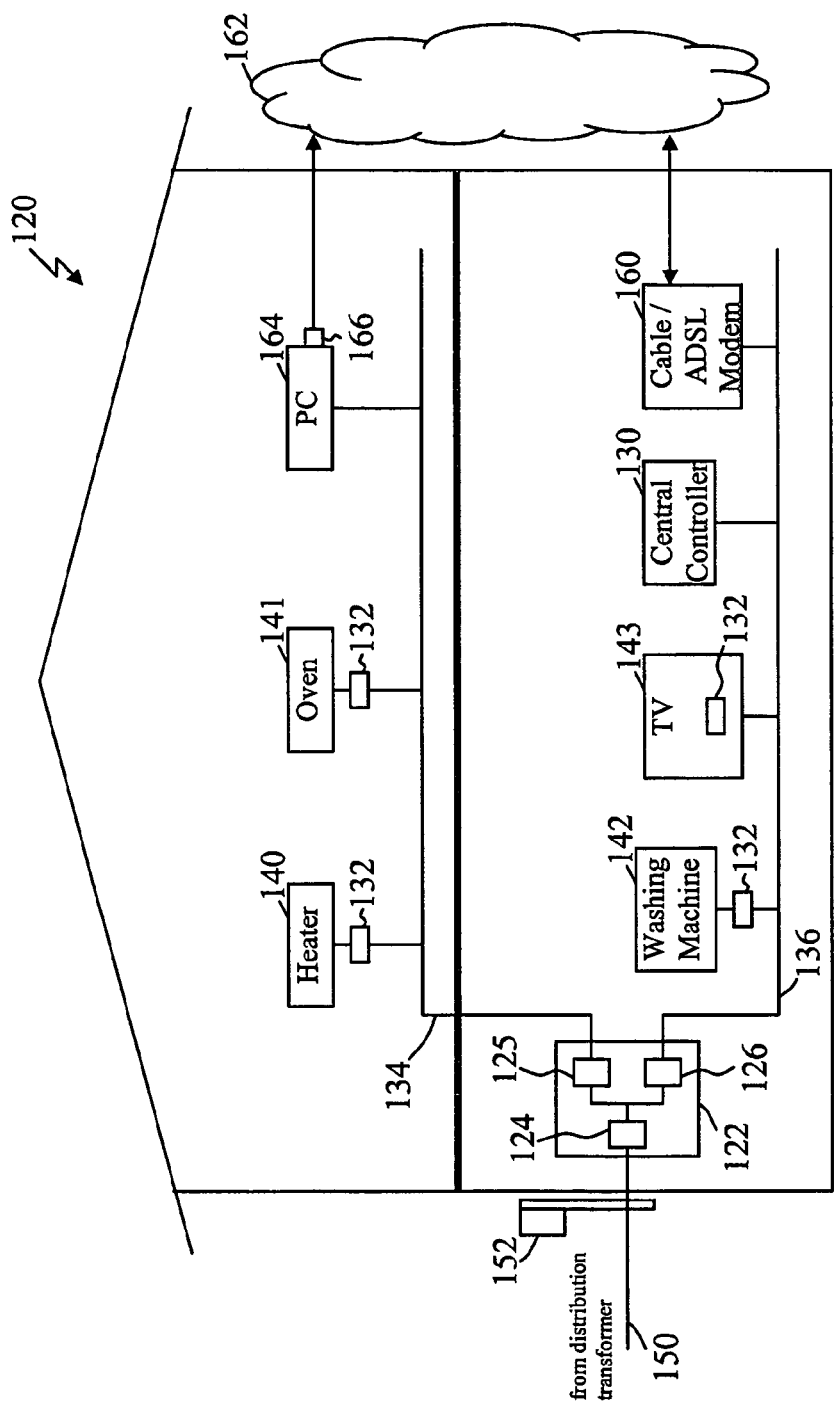
FIG. 1 depicts a simplified block diagram of a local PLC network according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide power line communication (PLC) networks for use in controlling power delivered to local consumer products. In some implementations, the power is controlled at one or more outlets of a local PLC. Through the use of the PLC network, some embodiments provide remote access and/or control over current and/or power delivery to consumer products. Further, some embodiments provide user information regarding power usage, state of operation, status information, statistics, parameter data, settings and other information. Current and/or power levels used by consumer products can be tracked, and current can be interrupted to one or more consumer products to control the usage of power and/or the operation of consumer product(s).

FIG. 1 depicts a simplified block diagram of a local PLC network 120 according to some embodiments. The local PLC network 120 includes a breaker board 122 with one or more circuit breakers 124-126, a controller, central controller or central monitoring unit 130, a plurality of sensor adaptors 132 distributed over the local PLC, multiple PLC network power lines, links or branches 134 and 136 and one or more consumer products 140-143. The local PLC network 120 is electrically coupled with an external power line 150 that delivers electrical power to the local PLC network 120, typically, through a meter 152, such as a Watt-hour meter that measures Watt-hours delivered to the local PLC network. In some instances, the local PLC network further includes a network interface 160 coupled with one or more distributed and/or remote networks 162 such as public switching telephony network (PSTN), the Internet, a wireless network (e.g., cellular, optical, satellite, or other wireless network), and/or other such relevant networks or combinations of networks. The network interface can be substantially any interface to allow communication over the distributed network(s), such as a modem (e.g., PC 10 and Cable IADSL modem) or other network interface.

The central controller 130 transmits and receives PLC signal data communications over the local PLC network 120 to and from one or more sensor adaptors 132. PLC data signals can be carried between a first local PLC power line 134 and a second local PLC power line 136 through the circuit breakers 125-126 of the breaker board 122. In some embodiments, the central controller 130 communicates command signals over the local PLC network 120 to sensor adaptors to control current and/or power delivery to one or more consumer products coupled with the sensor adaptors. Additionally in some implementations, the central controller 130 can transmit and/or receive communications external to the local PLC network 120 through the external PLC 150 network and/or the network interface 160 over the distributed network 162, and in some instances, the network interface 160 is incorporated into the central controller.

In some embodiments, the local PLC network 120 additionally or alternatively includes one or more computers or other processor devices 164. The computer 164 typically can communicate over the local PLC network with a PLC network interface incorporated into the computer and/or through a sensor adaptor 132. In some implementations the computer further communicates with the network interface 160 and/or includes a network interface 166 that allows communication with the distributed network 162. In some embodiments, the network interface 160 can be replaced by the computer network interface 166 such that the central controller 130 can receive and transmit communications over the distributed network 162 through the computer network interface 166.

The local PLC network 120, for example, can be implemented according to the HomePlug power line network standard. Typically, electric power is carried from the external power line and/or external PLC network 150 through the watt-hour meter 152 and distributed over one or more local power lines 134, 136 through the breaker board 122. The breaker board 122 includes the circuit breakers 124-126 as protection to the local PLC network and consumer products 140-143, the central controller 130, computer 164 and other devices connected with the local power lines 134, 136 of the local PLC network 120. The breaker board 122 further provides PLC communication coupling between the branches of the local PLC network 120 by establishing one or more PLC communication paths between local PLC power lines 134, 136. For example, the PLC communication signals pass from a sensor adaptor 132 on the second local PLC power line 136, through a second circuit breaker 125 to an internal connection of the breaker board 122 and out a third circuit breaker 126 to the first local PLC power line 134 to be received by the central controller 130. Communications from the central controller 130 can take a reverse path to the one or more sensor adaptors 132 of the second local PLC power line or other local PLC power lines.

The consumer products are typically connected with the local power lines 134, 136 and PLC network through a sensor adaptor 132. Alternatively, one or more of the consumer products can be constructed to include a sensor adaptor and/or the capabilities of the sensor adaptors as described below. The sensor adaptors at least in part monitor the current usage level of the consumer product coupled to the local PLC power lines through the adaptor and communicate over the local PLC network 120 with the central controller 130.

The central controller 130 monitors and/or gathers data from the sensor adaptors 132 and/or consumer products having sensor adaptor capabilities to determine usage of the consumer products 140-143. The consumer products can be substantially any consumer product such as cloths washing machine, cloths dryer, heater, air conditioner, television, stereo, digital versatile disc (DVD) player, compact disc (CD) player, computer, light, lamp, refrigerator, and substantially any other consumer product. Based on programmed parameters the central controller 130 can at least in part control the usage of the consumer products through communication with the sensor adaptors 132 and/or the consumer products.

Figure 2:
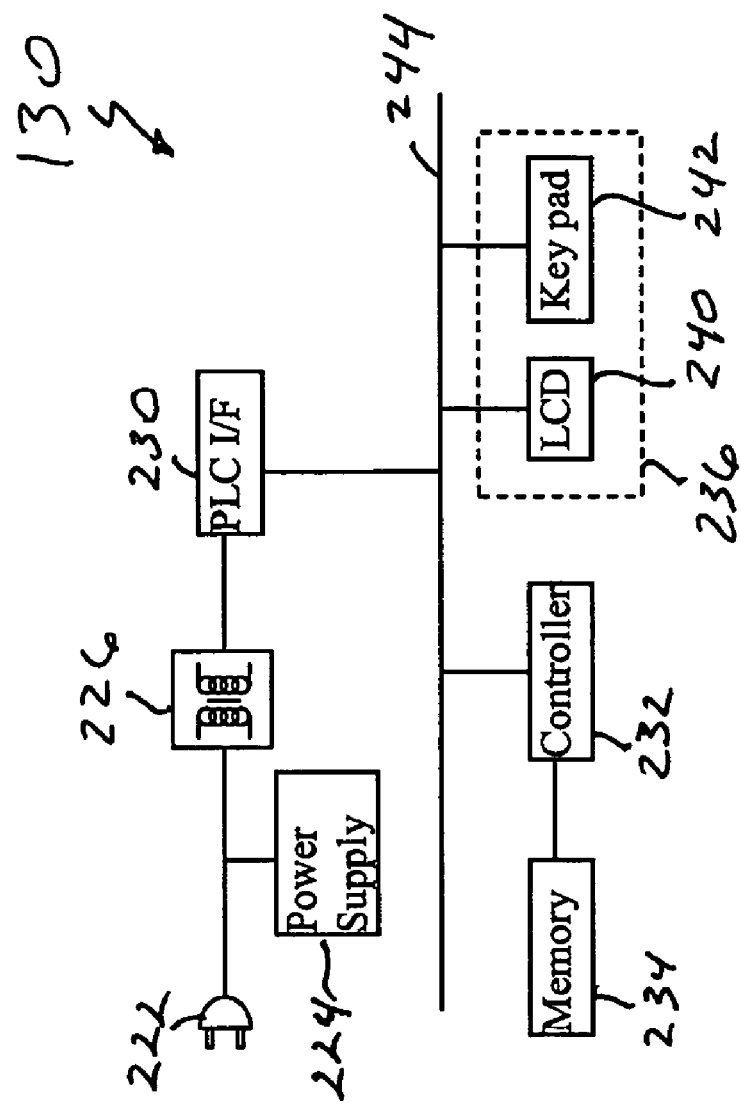
FIG. 2 depicts a simplified block diagram of one implementation of the central controller to be implemented in the network of FIG. 1.

FIG. 2 depicts a simplified block diagram of one implementation of the central controller 130 according to some embodiments. The central controller 130 includes an input port, plug or other adaptor 222 to connect to the power lines 134, 136 of the local PLC network 120, a power source block 224, a PLC coupler 226, a PLC interface 230, a controller 232, memory 234, a user interface 236 that can include, for example, a display 240 and a keyboard, keypad, touch screen or other entry device 242, and a communication bus 244.

The central controller 130 is coupled to the PLC power lines 134, 136 through the plug 222 to transmit and/or receive PLC communications over the local PLC network 120. Power to the central controller 130 is received through the power source 224 from the local power lines 134, 136. In some implementations, the power source 224 further includes one or more batteries, solar cells, or other sources that can supply power. The power source 224 obtains, for example, DC 5 volts from the AC power lines 134, 136 and distributes the power to the components of the central controller 130. In some instances, the battery is a chargeable battery charged from the local power lines 134, 136 when power is available from the power lines, and supplies power to at least the central controller 130 when power is not available from the local power lines 134, 136, such as during a power outage.

The PLC coupler 226 connects to the plug 222 coupling PLC data communications and/or signals to and from the central controller 130. The PLC coupler cuts high AC voltages and passes PLC data signals to and/or from the central controller. In some embodiments, the PLC coupler may include a transducer and may be an inductive coupler such as toroid coupling transformer, a capacitive coupler or other relevant coupler or combination of couplers, for coupling data to and/or from the central controller.

The PLC interface 230 coordinates the communication of data to and from the local PLC network 120 and/or external PLC 150. The controller 232 communicates with the other device of the local PLC network 120 through the PLC interface 230. The controller 232 can be implemented through one or more processors, microprocessors, computers, central processing units (CPU) and/or other such device for providing overall functionality, data processing and/or implementing control over the central controller 130 and in some instances the local PLC network 120. The memory 234 stores software programs, executables, data, control programming, scheduling, runtime parameters, operation conditions and parameters, other relevant programs and data, and/or instructions executable by a processor, machine or computer. The memory can be implemented through ROM, RAM, disk drives, flash memory, removable medium (e.g., floppy disc, hard disc, compact disc (CD), digital versatile disc (DVD) and the like), and substantially any other relevant memory or combinations of memory. Generically, the memory 234 may also be referred to as a computer readable medium. The local PLC network control provided through the controller 232 may be implemented by software stored in memory and executed on a processor and/or stored and executed in firmware. Further, the one or more processors can be implemented through logic devices, hardware, firmware and/or combinations thereof. Thus, the controller 232 described herein may be implemented using substantially any relevant processor logic or logic circuitry. In some embodiments, the controller 232 is implemented through a computer running software and/or firmware to implement control monitoring the local PLC network 120 as described above and further below. The controller and/or PLC communications can be distributed through the central controller 130 over one or more buses 244, which can be implemented through substantially any relevant bus such as a 68 k-type asynchronous bus or other bus or combination of buses.

Figure 3:
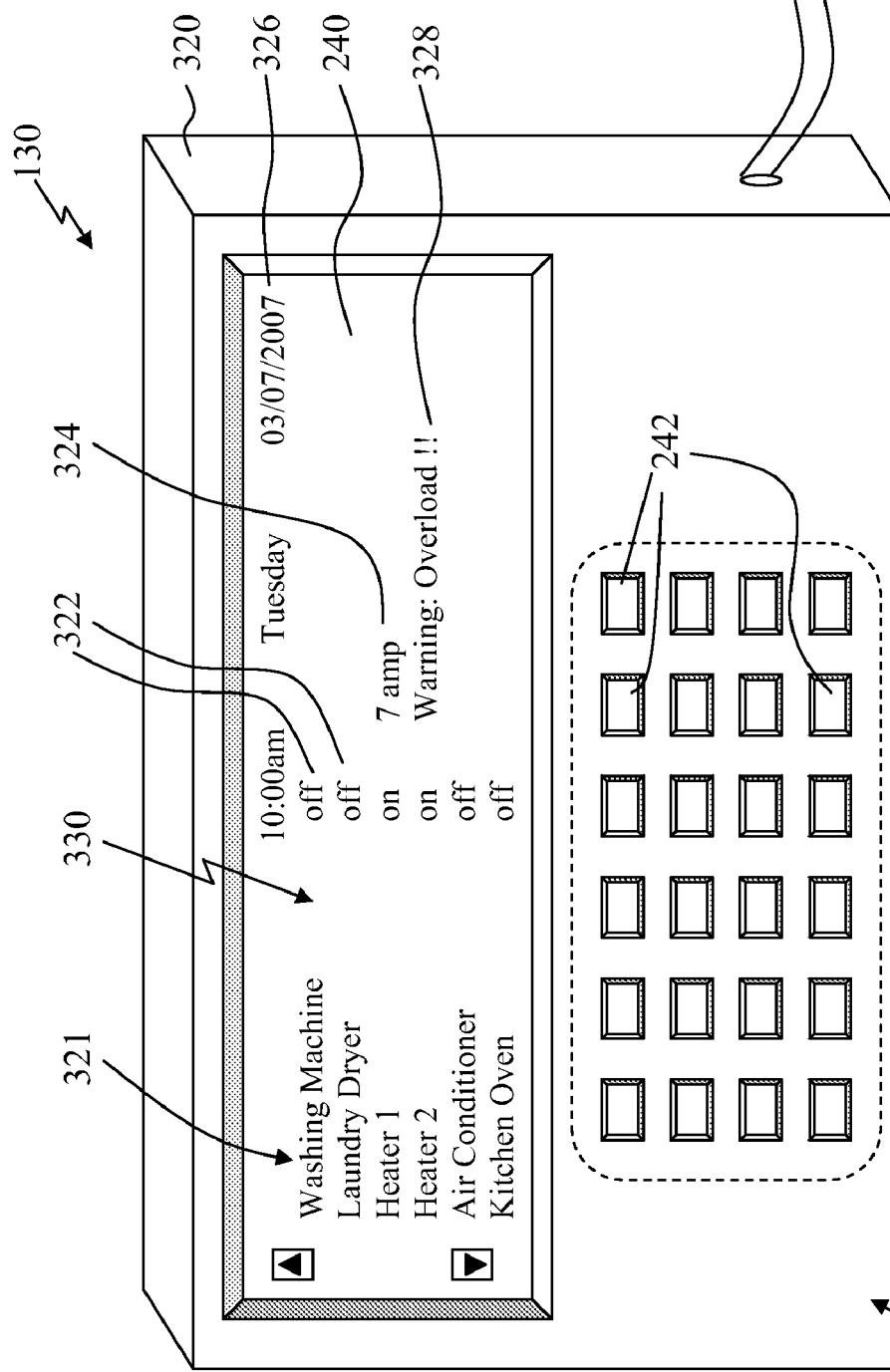
FIG. 3 depicts a simplified perspective view of an example implementation of a central controller.

FIG. 3 depicts a simplified perspective view of an example implementation of a central controller 130. The central controller can include a casing 320, the plug or other adaptor 222 connecting to the power lines 134, 136 of the local PLC network 120, and the user interface 236 that allows a user to input control parameters, determine settings, determine statistics of the local PLC network 120 and/or specific consumer products 140-143 or other devices on the local PLC network, and otherwise adjust control of the local PLC network 120. The user interface can include, for example, a display 240 such as a liquid crystal display (LCD), light emitting diode (LED) display, plasma screen, touch screen, or other such displays. Further, one or more input controls 242 can additional be included such as buttons, an alphanumeric keyboard, touch screen, dials and other such input devices or combinations of input devices. A user can determine statistics of the local PLC network 120 through the display 240 and/or enter or adjust operating parameters through the user interface 236. Data entered by the user from the input controls 242 is sent to the controller 232. The display 240 displays data sent from the controller.

As shown in FIG. 3, the display 240 can provide statistics, parameters, listings of devices of the local PLC network, and other information, such as indicating consumer product names and/or sensor adaptor identifiers 321, power status 322 (e.g., on or off), a current level value 324, a present time and/or date 326, and other relevant information. In some embodiments, the PLC network information is provided through a displayed user interface 330 that allows a user to interact with central controller, e.g., make selections through the display using a mouse, pointer or other selection method. The user interface can be configured with multiple different screens and/or user interfaces that display information and/or allow users to enter and/or define parameters, limits, names and other data. For example, a user may configure a current usage limit for each consumer produce and/or sensor adaptor.

The central controller 130 monitors the current and/or power usage of one or more consumer products 140-143 of the local PLC network 120. Further in some implementations, the central controller 130 controls the operation of one or more of the consumer products. For example, when it is detected that a current being drawn by a consumer product exceeds a defined threshold level, the central controller 130 can cause power to the consumer product to be interrupted and/or a warning message 328 can be activated and/or displayed on the display 240. The user can see the power status of one or more consumer products 140-143 in communication with the controller, either directly and/or through a sensor adaptor 132.

Additionally or alternatively, the central controller 130 can remotely turn on or off consumer products when desired. Further in some embodiments, the central controller 130 controls each sensor adapter 132 so that a consumer product can be turned on or off at one or more specified times. The central controller 130 is shown as an independent, stand alone device. In some embodiments, however, the central controller can partially or fully be implemented through the computer 164, through one or more of the consumer products 140-143 having processing capabilities, or other processing devices of the local PLC network 120.

Figure 4:
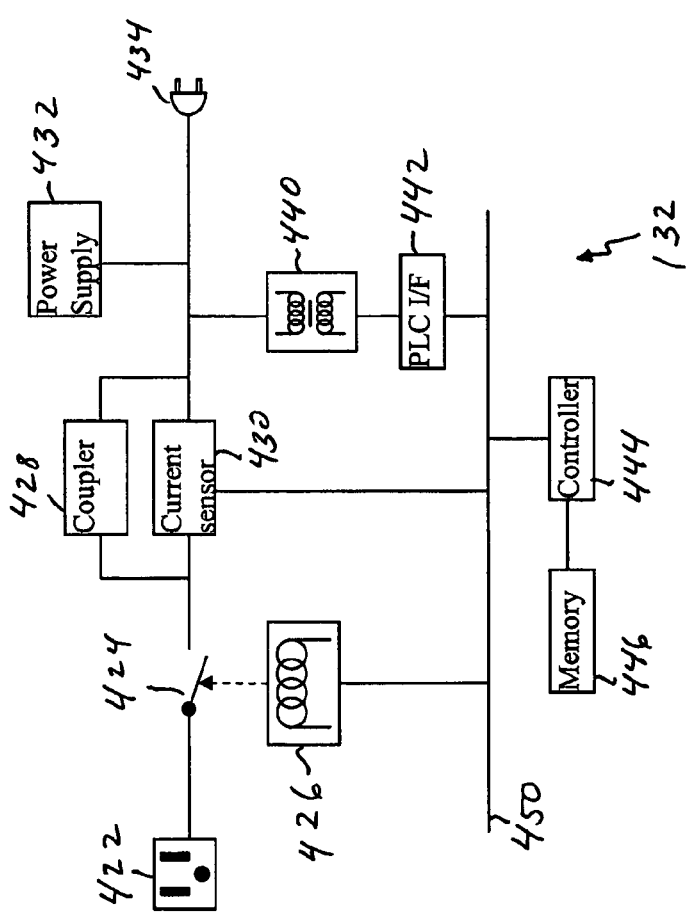
FIG. 4 depicts a simplified block diagram of a sensor adaptor that can be implemented in the PLC network of FIG. 1.

FIG. 4 depicts a simplified block diagram of a sensor adaptor 132 according to some embodiments. The sensor adaptor 132 includes a receptacle or PLC output port 422, an adaptor switch 424, a solenoid or other relevant switch trigger or control 426, a PLC power line data signal coupler 428, a current or power sensor 430, a power source or supply 432, a PLC input port, plug or other adaptor 434, a controller PLC data signal coupler 440, a PLC interface 442, an adaptor controller 444, a memory 446 and one or more communication buses or other relevant internal communication network 450. In operation, the sensor adaptor 132 provides an interface between the PLC power lines 134, 136 and the consumer product 140-143. The sensor adaptor connects with the PLC power lines 134, 136 through the plug 434 through which power and PLC data signals are received. The electric power is carried through the current sensor 430 and the adaptor switch 424 to the receptacle 422 to which the consumer product is connected to receive the electrical power.

The power supply 432 further couples with the plug 434 receiving power from the local power lines 134, 136 and delivering power to the relevant components of the sensor adaptor 132. The power supply 432 obtains, for example, DC 5 volts from the AC power lines 134, 136 and distributes the power accordingly. In some embodiments, the power supply 432 additionally or alternatively includes a battery or other power source that delivers power to at least the adaptor sensor. In some instances, the battery is a chargeable battery charged from the local power lines 134, 136 when power is available from the power lines, and supplies power to at least the sensor adaptor 132 when power is not available from the local power lines 134, 136.

The controller PLC coupler 440 connects to the plug 434 coupling PLC signal data to and/or from the sensor adaptor 132. The PLC coupler cuts the high AC voltage and passes PLC data signals to the adaptor controller 444. In some embodiments, the PLC coupler may include a transducer and may be an inductive coupler such as toroid coupling transformer, a capacitive coupler or other relevant coupler or combination of couplers, for coupling data to and/or from the adaptor controller 444. In some implementations, the controller PLC coupler 440 is similar to the PLC coupler 226 of the central controller. Similarly, the PLC power line coupler 428 passes PLC data communications and/or signals between a consumer product coupled to the receptacle 422 and the local PLC power line 134, 136 establishing PLC communication between the consumer product at the sensor adaptor 132 and the central controller 130, other consumer product on the local network 120 or other local or remote devices capable of receiving PLC signals. The PLC power line coupler 428 can be implemented similar to the controller PLC coupler 440.

The PLC interface 442 establishes PLC communication capabilities between the sensor adaptor and the local power lines 134, 136, and is controlled at least in part by the adaptor controller 444. The adaptor controller 444 communicates with the central controller 130 and/or other sensor adaptors 132 or consumer products of the local PLC network 120 through the PLC interface 442.

The adaptor controller 444 provides control for the sensor adaptor 132, coordinates the operation of the adaptor switch 424 and communications to and from the sensor adaptor 132. The adaptor controller can be implemented through one or more processors, microprocessors, computers, CPUs and/or other such device for providing overall functionality, data processing and/or implementing control over the sensor adaptor 132. The PLC communication control provided through the adaptor controller 444 may be implemented by software stored in memory and executed on a processor and/or stored and executed in firmware. Further, the one or more processors can be implemented through logic devices, hardware, firmware and/or combinations thereof. Thus, the adaptor controller 444 described herein may be implemented using substantially any relevant processor logic or logic circuitry. In some embodiments, the adaptor controller 444 is implemented through a computer running software and/or firmware to implement current and/or power usage, power control over one or more consumer products and communicating over the local PLC network 120 as described above and further below.

The memory 446 stores software programs, executables, data, control programming, scheduling, runtime parameters, operation conditions and parameters, other relevant programs and data, and/or instructions executable by a processor, machine or computer. The memory can be implemented through ROM, RAM, disk drives, flash memory, removable medium (e.g., floppy disc, hard disc, compact disc (CD), digital versatile disc (DVD) and the like), and substantially any other relevant memory or combinations of memory. Generically, the memory 446 may also be referred to as a computer readable medium.

In some embodiments, one or more software programs utilized by the adaptor controller 444 are stored in the memory 446. The adaptor controller 444 controls the current sensor 430, the PLC interface 442 and/or solenoid 426 over the internal bus(es) 450. The internal bus 450, for example, is an I2C bus or other relevant bus or combination of buses.

The current sensor 430 consists of, for example, a current transformer and an analog-to-digital converter. A digitalized current usage level is forwarded to the adaptor controller 444. In some implementations, the adaptor controller 444 communicates the measured current data to the central controller 130 through the PLC interface 442 and over the local PLC power line(s) 134, 136. Additionally and/or alternatively, the central controller 130 and/or the adaptor controller 444 can track the current usage through the sensor adaptor 132. In tracking the usage, the adaptor controller 444 can maintain an accumulated or summed use of current and/or power by the one or more consumer products receiving power through the sensor adaptor, maintain an average usage (e.g., average hourly usage), record one or more measurements, track peak usage, average usage, and other such tracking and/or evaluating. Still further in some embodiments, the adaptor controller 444 can be provided, for example through the central controller 130, with a current and/or power threshold, which can be a maximum peak current threshold, a maximum accumulated use threshold or other relevant threshold. In some operations, when the central controller 130 detects a predetermined relationship between the measured current usage level and the current threshold, the adaptor controller 444 can be instructed to activate the solenoid 426 to open the adaptor switch 424 to interrupt the current flow to the one or more consumer products. Additionally or alternatively, the adaptor controller 444 can locally monitor current usage levels to determine whether to interrupt the current and/or power to the consumer product(s).

The adaptor switch 424 is typically closed allowing current to flow through the sensor adaptor and to the consumer product 140-143. When the adaptor controller 444 receives an interrupt or shut down command from the central controller 130, the adaptor controller 444 turns on the solenoid 426 to open the adaptor switch 424. Similarly in some implementations, the adaptor controller 444 can activate the solenoid 426 to close the adaptor switch 424 upon receipt of a "turn-on" or close switch command.

In some embodiments, the sensor adaptor is a plug adaptor that mounts directly with a standard wall power outlet. One or more consumer products 140-143 can then be plugged into the receptacle 422 to receive power from the local power lines 134, 136 through the sensor adaptor 132.

Figure 5:
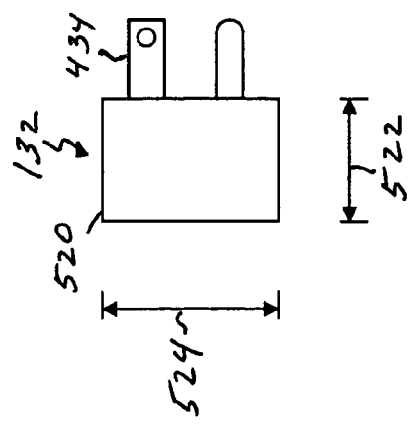
FIGS. 5 and 6 depict simplified side and front views, respectively, of a sensor adaptor of FIG. 4.
Figure 6:
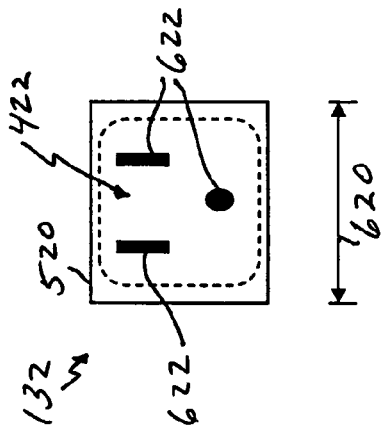

FIGS. 5 and 6 depict simplified side and front views, respectively, of a sensor adaptor 132 according to some embodiments. The sensor adaptor can include a casing 520 that encloses the components of the sensor adaptor. The plug 434 extends from the casing to be inserted into a wall outlet, and in some embodiments is implemented through a two or three prong plug or other plug configuration. The receptacle 422 is formed in the casing with slots or apertures 622 to receive a plug of the consumer product, for example a two or three prong plug or other plug configuration, with electrical contacts or connectors interior to the casing 520.

The sensor adaptor 132 has a depth 522, height 524 and width 620. In some embodiments, at least the depth 522 is maintained at a minimal size to limit the amount of space that is needed to employ the sensor adaptor and/or interfere with the placement of the consumer product (e.g., avoid having to place a consumer product an undesirable distance from a wall due to the depth 522 of the sensor adaptor). Similar in some embodiments, the height 524 is additionally or alternatively limited to avoid interfering with the use of one or more outlet receptacles. For example, often outlets include two outlet receptacles, and the height 524 of the sensor adaptor is configured to avoid blocking a second receptacle. The minimizing of the width 620 of the sensor adaptor 132 is typically limited by the size of the plug 434 and/or receptacle 422 conforming to a desired plug configuration. The sensor adaptor can be configured, for example, similar to a wall-wart adaptor. Further, the sensor adaptors can be manufactured at relatively low costs, with relatively simple components. Some embodiments of the sensor adaptor can include two or more plugs 434 and/or receptacles 422, and in some implementations can be configured to replace existing outlets being directly hardwired to the local power lines 134, 136 and typically be positioned recessed into an outlet box, for example, in a wall.

Referring back to FIG. 1, the central controller 130 communicates with the one or more sensor adaptors 132 (and/or directly with consumer products that have sensor adaptor capabilities) to monitor and/or control the power delivered to consumer products 140-143. The PLC interfaces 230, 442 of the central controller 130 and sensor adaptors 132, respectively, allow communication between the central controller and the sensor adaptor over the local PLC power lines 134, 136 of the local PLC network 120. In some instances, the PLC data signals between the central controller and one or more sensor adaptor can include passing the communication through one or more circuit breakers 124-126 of the breaker board 122. Typically, circuit breakers include a switch that opens when a current exceeding a threshold is drawn through the circuit breaker. This opening of the switch in a typical breaker also breaks PLC connections between devices of a local PLC network.

Figure 7:
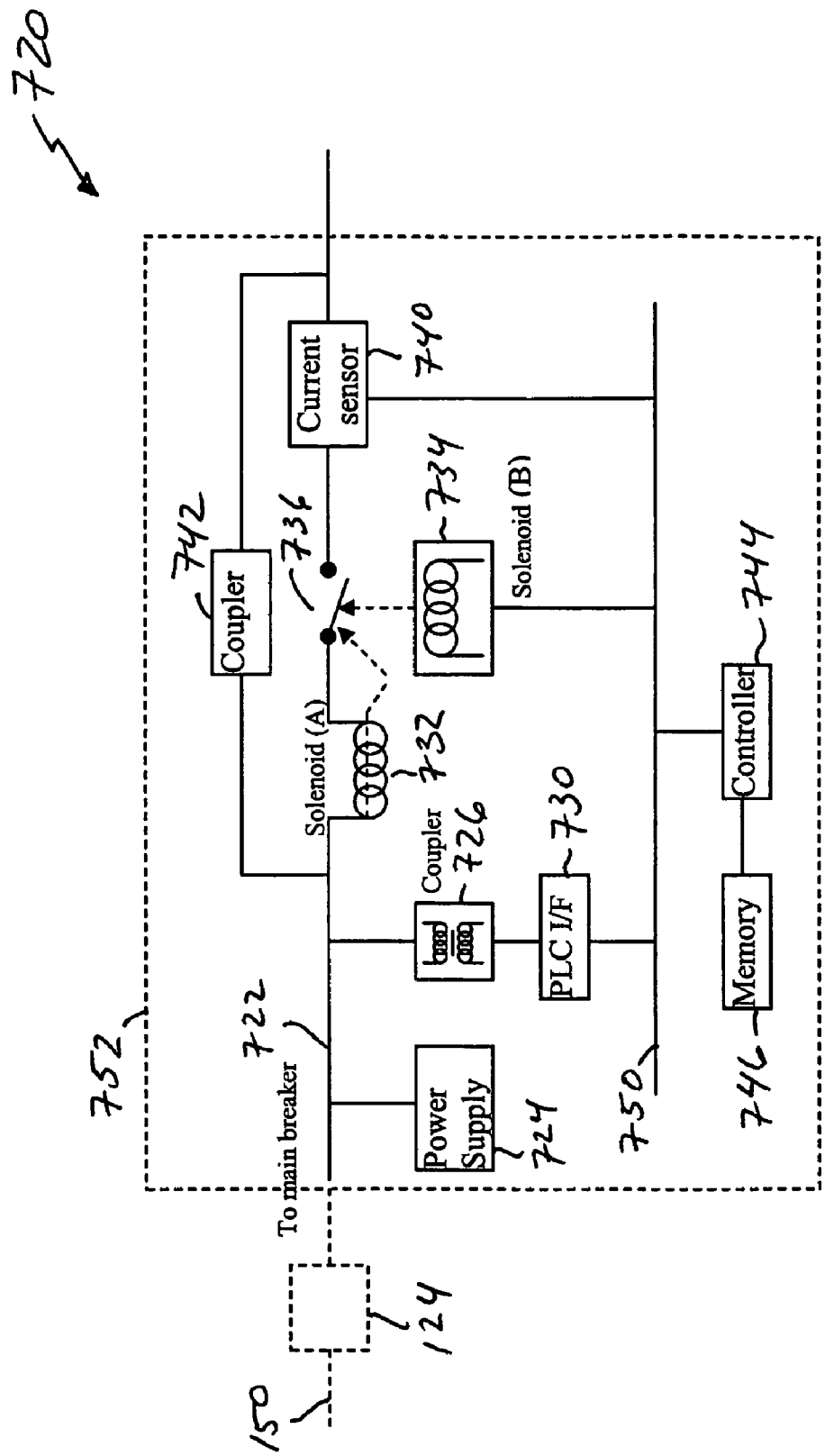
FIG. 7 depicts a simplified block diagram of a PLC circuit breaker that can be implemented in the breaker board of FIG. 1.

FIG. 7 depicts a simplified block diagram of a PLC circuit breaker 720 according to some embodiments that can be implemented in the breaker board 122 as one or more of circuit breakers 124-126. Typically, the PLC circuit breaker 720 connects between an external power line 150 or main power source and one or more branches 134, 136 of the local PLC network 120. The PLC circuit breaker 720 includes an internal power line 722, a power supply 724, a breaker controller PLC coupler 726, a PLC interface 730, a first solenoid or other switch control 732, a second solenoid or switch control 734, a breaker switch 736, a current sensor 740, a breaker PLC signal coupler 742, a breaker controller 744, one or more memory 746, and an internal bus or communication network 750. Typically, the PLC circuit breaker further includes a housing or casing 752 to protect the PLC circuit breaker components and/or to allow simplified mounting in the local PLC network 120 and/or breaker board 122. In some embodiments, the circuit breaker housing 752 has dimensions that are similar to existing and/or conventional circuit breakers. The PLC data signals are communicated through the breaker board 122 between different local PLC power lines 134, 136. The PLC circuit breakers, at least in part, maintain PLC communication paths between local PLC power lines even when the breaker switch 736 is open (as described below) continuing to allow the central controller 130 to communicate over the local PLC network 120 with the sensor adaptors 132 and/or the PLC circuit breaker(s), including those instances where the circuit breaker 126 to the local PLC power line 136 supplying power to the central controller 130 is open and the central controller is operating from battery power or other local power source.

The power supply 724 couples with the internal power line 722 to extract power to drive one or more components of the PLC circuit breaker 720. In some implementations, the power supply 724 is implemented similar to the power supply 432 to obtain, for example, DC 5 volts from the AC power line and distributes the power accordingly. Additionally or alternatively, the breaker power supply 724 includes a battery or other power source, and in some instances is a chargeable battery charged from the power lines when power is available and supplies power when power is not available from the power line(s) 150.

The breaker controller PLC coupler 726 connects to the internal power line 722 to couple PLC signal data to and/or from the breaker controller 744. This establishes a PLC communication path between the breaker controller and the central controller 130 allowing the central controller 130 to receive current usage level information from the breaker based on current levels measured through the current detector 740 as well and the breaker controller 744 receiving breaker commands from the central controller 130 to open and/or close the breaker switch 736 based on predetermined relationships between measured current levels and one or more breaker threshold levels. The breaker controller PLC coupler 726 cuts the high AC voltage and passes PLC data signals to the breaker controller 744. In some embodiments, the breaker controller PLC coupler 726 can include a transducer and may be an inductive coupler such as toroid coupling transformer, a capacitive coupler or other relevant coupler or combination of couplers, for coupling PLC data to and/or from the breaker controller 744. In some implementations, the breaker controller PLC coupler 726 is similar to the PLC coupler 226 of the central controller.

The PLC interface 730 establishes PLC communication capabilities between the breaker controller 744 and the external power line(s) 150 and/or the local power lines 134, 136. The breaker controller 744 communicates with the central controller 130 of the local PLC network 120 through the PLC interface 730. Utilizing the local PLC network 120, the central controller 130 can control the activation and/or deactivation of the PLC circuit breaker 720 as described below.

The breaker controller PLC coupler 726 and/or PLC interface 730 are shown on a main power line side of the breaker switch 736. This is one implementation of the PLC circuit breaker. The PLC circuit breaker, however, can be implemented in other configurations while still achieving the desired local power line and/or consumer product protection and maintaining communication over the local PLC network 120 and/or external PLC network 150. For example, the breaker controller PLC coupler 726 and/or PLC interface 730 can be positioned on a local power line side of the breaker switch and in communication connection with at least the breaker PLC signal coupler 742 and breaker controller 744.

The first solenoid 732 cooperates with the breaker switch 736 to open and/or close the switch. In some implementations, the first solenoid operates similar to solenoids of common circuit breakers such that when a current level passing through the circuit breaker exceeds a primary fixed threshold, the solenoid causes the breaker switch 736 to open to avoid excess current being drawn by one or more consumer products and/or short circuits within the local power lines. In these implementations, current passes along the internal main power line 722 and through the first solenoid 732 and switch 736 to be delivered to one or more local power lines 134, 136 and consumer products 140-143. When the current level exceeds a predefined fixed primary threshold (e.g., 30 Amps) the first solenoid triggers the breaker switch 736 to open and interrupt the supply of power beyond the circuit breaker 720 and into the local power lines 134, 136 of the PLC network 120. In some embodiments, the triggering of the breaker switch 736 causes a physical opening of the switch that is to be manually closed by a user to resume AC current flow.

The second solenoid or breaker switch controller 734 operates similar to the first solenoid 732 to trigger the opening and/or closing of the breaker switch 736. The breaker controller 744, however, causes the activation of the second solenoid 734 to open and/or close the breaker switch. The breaker controller receives current information from the current sensor 740 notifying the breaker controller of the amount of current passing through the PLC circuit breaker 720. One or more secondary thresholds are tracked by the breaker controller 744 and/or central controller 130. The one or more secondary thresholds can be stored in the breaker controller 744, the local breaker memory 746, the central controller 130 or other relevant local or remote storage device. When the current meets or exceeds a secondary threshold, the breaker controller 744 activates the second solenoid 734 to trigger the breaker switch 736 to open interrupting power flow through the PLC breaker 720.

The secondary threshold(s) can be a fixed threshold fixed in the breaker controller 744 or memory 746. In other embodiments, however, the secondary threshold(s) is a variable threshold that can be defined by a user, the central controller 130 and/or varied. For example, a user can define a secondary threshold through the central controller 130, computer 164 and/or device on the local PLC network 120 or remote to the PLC network as further described below that communicates the secondary threshold over the local PLC network 120 to be received by the breaker controller 744 and stored, for example, in the memory 746. The PLC breaker 720 and/or breaker controller 744 can include a local PLC network address and/or identification to allow focused communication to the desired PLC breaker. One or more PLC breakers can be incorporated into the local PLC network 720 in the breaker board 122, consumer products 140-143, sensor adaptors 132, along local power lines 134, 136 and/or other locations within the local PLC network 120.

The breaker controller 744 provides control over the PLC circuit breaker 720, coordinates the operation of the breaker switch 736 and communications to and from the PLC breaker 720. The breaker controller can be implemented through one or more processors, microprocessors, computers, CPUs and/or other such device for providing overall functionality, data processing and/or implementing control over the PLC circuit breaker. The breaker controller 744 controls the PLC interface 730 over the internal bus 750. The internal bus 750 can be substantially any communication connection, such as I2C bus, or other relevant bus or communication connection. The PLC communication control provided through the breaker controller may be implemented by software stored in memory and executed on a processor and/or stored and executed in firmware. Further, the one or more processors can be implemented through logic devices, hardware, firmware and/or combinations thereof. Thus, the breaker controller 744 described herein may be implemented using substantially any relevant processor logic or logic circuitry. In some embodiments, the breaker controller 744 is implemented through a computer running software and/or firmware to implement at least the opening and/or closing of the breaker circuit and communication over the local PLC network 120.

The memory 746 stores software programs, executables, data, control programming, scheduling, runtime parameters, operation conditions and parameters, other relevant programs and data, and/or instructions executable by a processor, machine or computer. The memory can be implemented through ROM, RAM, disk drives, flash memory, removable medium (e.g., floppy disc, hard disc, compact disc (CD), digital versatile disc (DVD) and the like), and substantially any other relevant memory or combinations of memory. Generically, the memory 234 may also be referred to as a computer readable medium.

The breaker PLC signal coupler 742 bridges the breaker switch 736 coupling across the switch and establishing a PLC communication path through the PLC breaker 720 even when the breaker switch 736 is open. Without the breaker PLC signal coupler 742, once the breaker switch 736 is opened PLC communication can no longer occur through the breaker. The breaker PLC coupler 742, however, cuts the high AC voltage and passes the PLC data signals around the breaker switch and through the PLC circuit breaker 720. The bypassing of the breaker switch 736 allows communication within the local PLC network 120 between PLC power lines 134, 136 while one or more breaker switches of PLC circuit breakers are open, and/or allows communication between one or more of the PLC power lines and the external PLC network 150 while one or more breaker switches of PLC circuit breakers are open. Further, the breaker controller 744 can communicate over the local PLC network 120 with the central controller 130 to notify the central controller of the triggering of the breaker switch 736 even when the breaker switch is open or other breaker switches of other PLC breakers are open. This provides the central controller 130 with further information about the operation of the local PLC network 120 and further allows the central controller to notify the user (e.g., through the display 240, alarm, sending communications to the computer 164, and/or external to the local PLC network).

In some embodiments, the breaker PLC signal coupler 742 can include a transducer and may be an inductive coupler such as toroid coupling transformer, a capacitive coupler or other relevant coupler or combination of couplers, for coupling PLC data through the PLC circuit breaker 720. In some implementations, the breaker PLC signal coupler 742 is similar to the PLC coupler 226 of the central controller and/or the controller PLC coupler 440. Still further, in some implementations, a single PLC coupler is utilized for both the breaker PLC signal coupler 742 and the controller PLC coupler 440. Other PLC communication bypasses can alternatively and/or additionally be employed, such as employing a controller PLC coupler and PLC interface pair on either side of the breaker switch and communicationally coupled with the bus 750.

The secondary threshold(s) can be programmed by a user, the central controller, by a manufacturer, distributor or installer prior to installing, and/or other devices. Similarly, the secondary threshold(s) may be adjusted and/or vary. Further in some embodiments, the secondary threshold(s) can vary over time and/or based on a schedule of expected power or current usage. Additionally, the secondary threshold(s) can be a peak threshold or an accumulation threshold where the breaker controller 744 and/or central controller 130 track the power and/or current through the PLC circuit breaker 720.

Typically, the primary solenoid 732 is configured based on a fixed primary threshold, for example 40 amps, that the user cannot change without changing the PLC circuit breaker 720. The second solenoid 734, alternatively, is controlled by the breaker controller 744 allowing the secondary threshold to be varied. This allows a user, manufacturer, installer, central controller or the like to set the secondary current threshold. In some embodiments, the first and second solenoids may be combined into a single solenoid that has a fixed primary threshold and the secondary threshold defined in the breaker controller 744 that activates the solenoid upon exceeding the secondary threshold. The combined solenoid may provide cost savings, space savings and/or simplify the circuit design. It is noted that the central controller 130 and/or the network interface 160 may not work if one or more of the breakers 124-126 is off interrupting current flow. In some implementations, the central controller 130, network interface 160 and/or one or more sensor adaptors can include local battery backup as described above, and/or are on a separate local power line 134, 136. Further in some embodiments, a secondary controller can be included that can be activated upon failure of the primary central controller 130. For example, the computer 164 or other consumer product with at least some central processing capabilities (e.g., a television with central processing capabilities) can take over central control in an event that the central controller 130 is no longer responding to requests.

Additionally or alternatively, the PLC circuit breaker 720 can further be employed to control the power usage of one or more consumer products 140-143. For example, the central controller 130 can determine that a local power line 134, 136 or consumer product is drawing current or power above a desired level and communicates over the local PLC power lines 134, 136 with the desired PLC breaker to open the breaker switch and interrupting current flow to the identified local power line and/or consumer product.

One or more of the circuit breakers 124-126 of the breaker board 122 can be implemented using a PLC circuit breaker 720 allowing remote switch control capability over one or more of the circuit breakers 124-126. The central controller can receive communications from the breaker controller 744 regarding the current passing through the PLC circuit breaker 720 as monitored by the current sensor 740 to allow the central controller to evaluate current usage and determine whether to activate or deactivate (e.g., open or close, respectively) the PLC circuit breaker. Alternatively or additionally, the central controller 130 can supply the PLC circuit breaker 720 with the secondary threshold level that is stored by the PLC circuit breaker and compared with current usage as detected through the current sensor 740.

The local PLC network 120 allows current and/or power usage to be monitored. The network 120 provides status information of sensor adaptors 132, consumer products 140-143, circuit breakers 124-126, central controller and/or other devices of the network, and further provides control over the network. In operation according to some implementations, the central controller 130 monitors the current usage over the local PLC network 120 and controls the power flow to one or more consumer products 140-143. When a current and/or power usage exceeds a desired threshold the central controller 130, PLC circuit breaker 720, and/or sensor adaptor 132 activate the adaptor switch 424 to interrupt and/or halt current flow to one or more consumer products. As such, the central controller can remotely monitor and control the current and/or power use over the local PLC network 120 by sending PLC data signals to selected one or more sensor adaptors (and/or consumer products with sensor adaptor capabilities).

Figure 8:
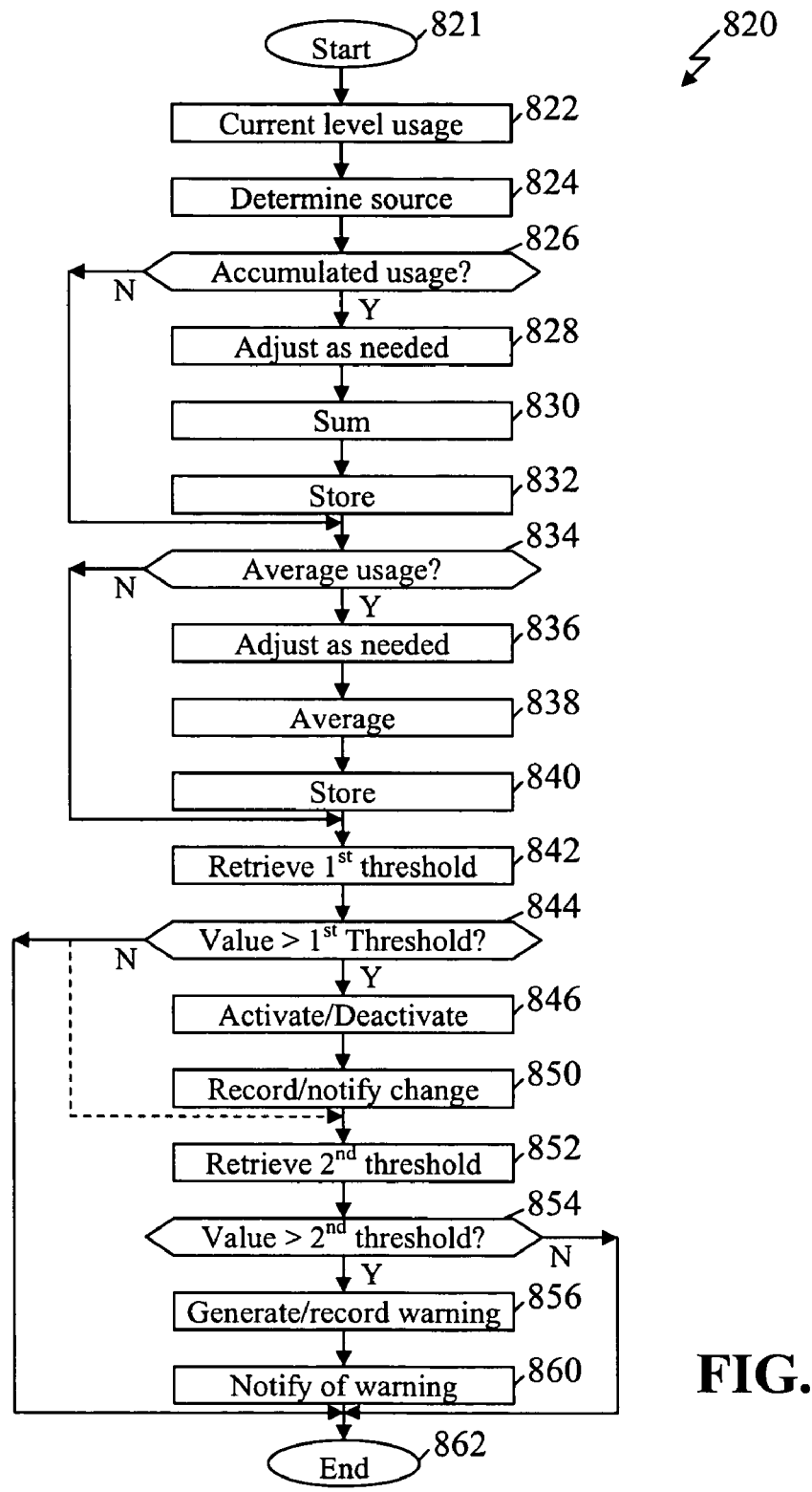
FIG. 8 depicts a simplified flow diagram of a process for use in monitoring and/or controlling current flow over a local PLC network.

FIG. 8 depicts a simplified flow diagram of a process 820 for use in monitoring and/or controlling current flow over a local PLC network 120. The process 820 starts at step 821. In step 822, a current level usage is communicated over the local PLC power lines 134, 136 to the central controller 130. The receipt of current level usage can be periodically forwarded from one or more sensor adaptors, circuit breakers and/or consumer products; forwarded upon detection of current levels exceeding one or more local thresholds; in response to a request from the central controller; and/or other such conditions. In step 824, the source of PLC data signal is determined. In some implementations the PLC data can include a source identifier, or other such methods for identifying the source. In step 826, the central controller determines whether a threshold associated with the identified source is based on a sum or an accumulated usage level. When the threshold is not based on an accumulated usage, the process skips to step 834.

Alternatively, in step 828 the process adjusts and/or resets the accumulated value when needed prior to taking into consideration the recently received current usage value. The resetting of the accumulated value may be based on a time threshold (e.g., the central controller may only be interested in an hourly usage, daily usage or other time frame). Additionally or alternatively, the accumulated value may be adjusted by deleting only received current usage values prior to proceeding to determine a new accumulated value. For example, the central controller may only be interested in an hourly or daily usage and thus deletes from the accumulated value those usage values received more than an hour or 24 hours ago, respectively, and then summing the current value and those received within the hour or 24 hours, respectively. In step 830, the received current usage is added to the accumulated value to obtain a revised accumulated value. In step 832, the process stores the determined accumulated value, and in some implementations the received current level usage value.

In step 834, it is determined whether the threshold is to be based on an average usage. When the threshold is not to be based on an average, the process skips to step 842. Alternatively, in step 836 the process adjusts and/or resets the averaged usage value when needed. In step 838, an average usage based on prior values and/or prior average(s) is determined. In step 840, the determined average value is stored.

The process then continues to step 842 where a first threshold is retrieved for the identified source of the current usage level value. In step 844, it is determined whether the recently received current usage level, the accumulated usage value, or average usage value exceeds the first threshold. When the first threshold is not exceeded the process 820 terminates in step 862 or continues to optional step 852. Alternatively in step 846, the source supplying the recently received current usage value is directed to activate or open the adaptor switch 424 (or PLC breaker switch 736) to interrupt current flow to the one or more consumer products receiving power through the sensor adaptor (or PLC circuit breaker 720).

In step 850, the central controller 130 records the change of status (e.g., from on to off, or off to on as appropriate), the time of the change, and/or notifies a user of the change of status. The notification to the user can be implemented by indicating the status on the central controller display 240, the computer 164, generating an alarm at the central controller and/or sensor adaptor, generating a communication over the local PLC to computer, activating a light on a sensor adaptor, generate communication over external PLC network 150 and/or distributed network 162, and other such notifications and/or combinations of notifications.

In some embodiments, the process 820 can include additional optional steps that provide warnings when current usage levels are getting close to shutoff levels. In step 852, the process identifies a second usage threshold for the identified source. In step 854, it is determined whether the current usage level, accumulated value or average value exceeds the second threshold. When the second threshold is not exceeded the process terminates at step 862. Alternatively, in step 856 the central controller generates and records a warning and the time. In step 860, the user is notified of the change of status or warning. The notification can be implemented as described above with regard to step 850. The process 820 terminates at step 862.

Figure 9:
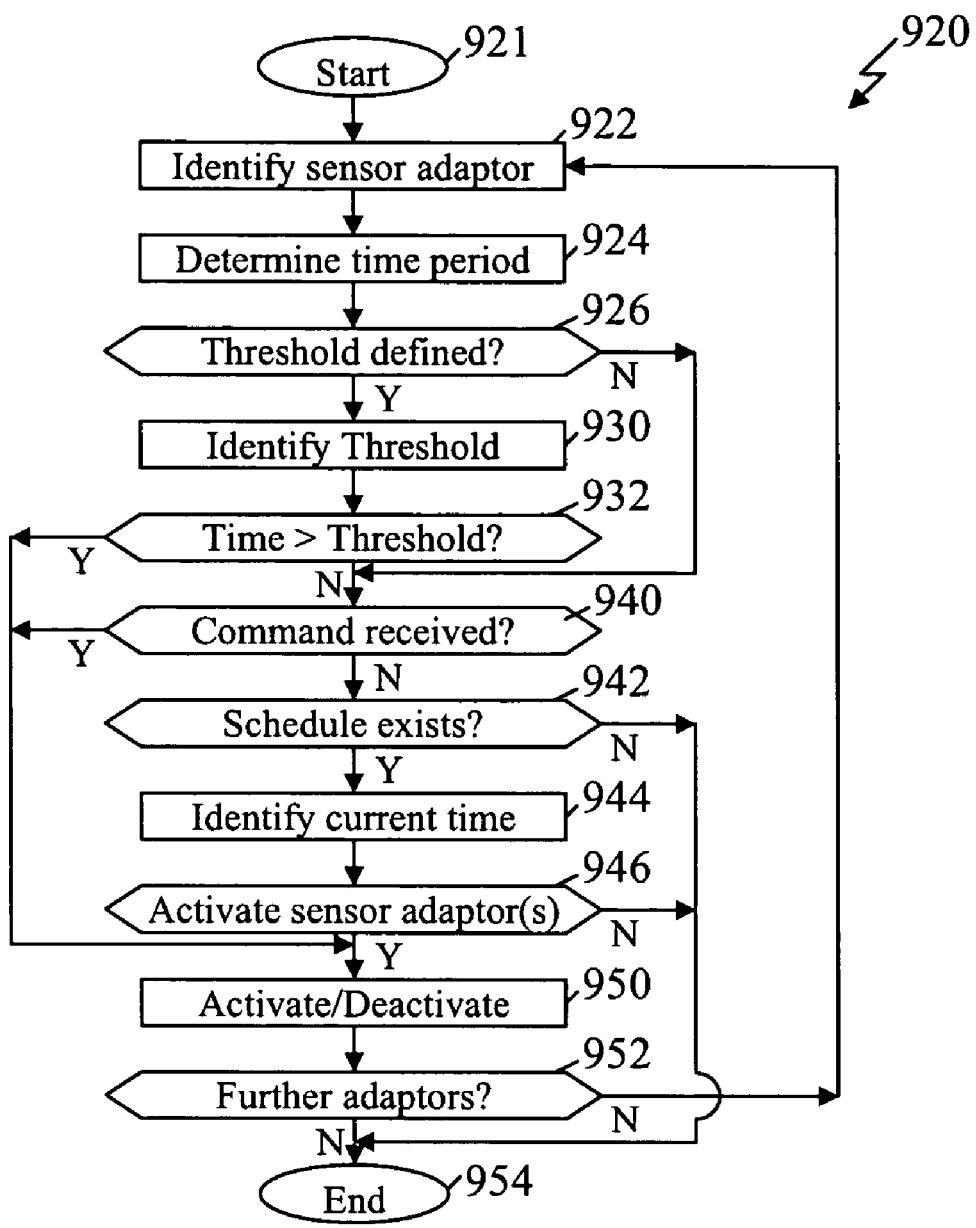
FIG. 9 depicts a simplified flow diagram of a process for use in controlling current supplied to one or more consumer products on the local PLC network.

FIG. 9 depicts a simplified flow diagram of a process 920 for use in controlling current supplies to one or more consumer products on the local PLC network 120. The process 920 starts at step 921. In step 922, a sensor adaptor, consumer product having sensor adaptor capabilities, or PLC circuit breaker 720 that has been activated to interrupt current flow to the consumer product is identified. In step 924, a period of time for which the current flow has been interrupted to the consumer product is determined. In step 926, it is determined whether a time threshold or period is defined for which the current flow is to be interrupted. When there is not a defined time threshold the process skips to step 940.

Alternatively, in step 930 the time threshold is identified. In step 932 the process determines whether the time threshold has been exceeded. When the time threshold has been exceed the process continues to step 950. When the time threshold has not been exceeded, step 940 is entered where it is determined whether a command has been received (e.g., received from the central controller user interface 236, computer 264, external PLC network 150, distributed network 162, or other sources). When a command has been received the process skips to step 950.

Alternatively in step 942, it is determined whether a schedule exists for controlling the identified sensor adaptor 132 (PLC circuit breaker or consumer product) controlling current flow to one or more consumer products. In those instances where there is not a schedule for the identified sensor adaptor the process 920 terminates at step 954. When there is a schedule, step 944 is entered where a current time is identified. In step 946, it is determined whether one or more sensor adaptor 132 (or consumer product) of the local PLC network 120 are to be activated (opening the adaptor switch 424 and interrupting the current flow) or deactivated (closing the adaptor switch and allowing current to flow to the consumer product(s)) according to the current time and the schedule.

When there are no scheduled activations/deactivations, the process 920 terminates at step 954. Instead when there are scheduled activations/deactivations, step 950 is entered where the appropriate sensor adaptor(s) (and/or consumer product) is activate or deactivate accordingly. In step 952, the process 920 determines whether there are further sensor adaptors (PLC circuit breakers, consumer products) to be evaluated. When there are, the process returns to step 922, alternatively, the process terminates at step 954.

Figure 10:
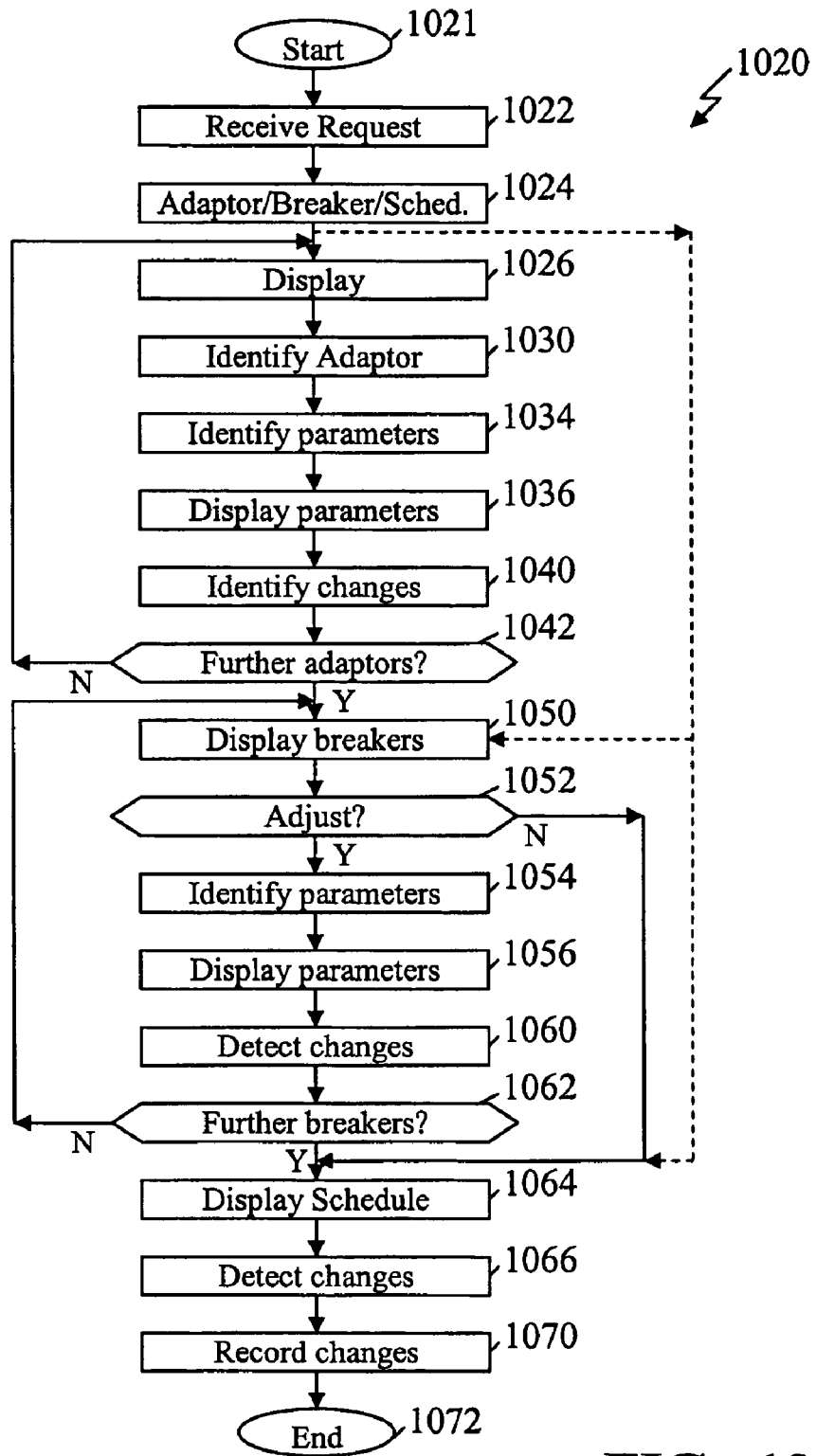
FIG. 10 depicts a simplified flow diagram of a process for use in setting parameters, programming and/or scheduling the control of the local PLC network.

FIG. 10 depicts a simplified flow diagram of a process 1020 for use in setting parameters, programming and/or scheduling the control of the local PLC network 120. The process 1020 starts at step 1021. In step 1022, a request to adjust parameters is received and identified. In step 1024, it is determined whether the user wishes to change parameters of a sensor adaptor 132, PLC circuit breaker 720, schedule or other parameters.

In step 1026, the one or more sensor adaptors 132, PLC circuit breakers 720, and/or consumer products with sensor adaptor capabilities of the local PLC network 120 are identified. In some embodiments, the sensor adaptors (consumer products) can be listed on a user interface displayed as selectable options on the user interface display 240 of the central controller, on the computer 164, on a remote computer coupled with the external PLC network 150 and/or distributed network 162, or otherwise listed. In step 1030, the process determines which sensor adaptor(s) is to be adjusted, which in some instances is determined by a user selecting one or more sensors to adjust.

In step 1034, the available parameters of the identified sensor adaptor are identified. Again in some embodiments, the available parameters can be displayed to the user as selectable options. The parameters can include on/off (or activate/deactivate) status, warning threshold level, activate/deactivate threshold level(s) and other such parameters. In step 1036, the user is provided with the parameters for the identified sensor adaptor (e.g., display parameters).

In step 1040, the process identifies changes to the parameters and enters and stores the changes to the selected parameters. Again, the user enters changes, typically, through the user interface 236, local computer 164 or other entry device. In step 1042, the process 1020 determines whether further sensor adaptors are to be adjusted. When further sensor adaptors are to be adjusted, the process returns to step 1026. Alternatively, the process continues to step 1050, where available PLC circuit breakers 720 of the local PLC network 120 are identified to the user. In step 1052, it is determined whether a PLC circuit breaker is to be adjusted. When there is no breaker to adjust, the process continues to step 1064. Alternatively, in step 1054, parameters of identified PLC circuit breaker are identified. In step 1056, the user is provided with the parameters for the identified PLC circuit breaker (e.g., display parameters), such as secondary threshold level and other parameters.

In step 1060, changes to the selected parameters of the PLC circuit breaker specified by the user are identified. In step 1062, it is determined whether further PLC circuit breakers are to be adjusted. When further PLC circuit breakers are to be adjusted, the process returns to step 1050. Alternatively, step 1064 is entered where the user is provided with a schedule. Again, the schedule can be displayed to the user. In step 1066, changes to schedule are identified. This can include an initial population of the schedule and/or adjustments to already defined schedule(s). In step 1070, the changes to sensor adaptor parameters, PLC circuit breaker parameters and/or the schedule are recorded and implemented. The process 1020 terminates at step 1072.

The schedule allows the local PLC network 120 to activate and/or deactivate consumer products based on time. For example, lights can be scheduled to come on at dusk, consumer products (e.g., lights, TV and/or radio) can be configured to come on when a user is out of town to simulate that a home owner is still present, and other such scheduling.

Figure 11:
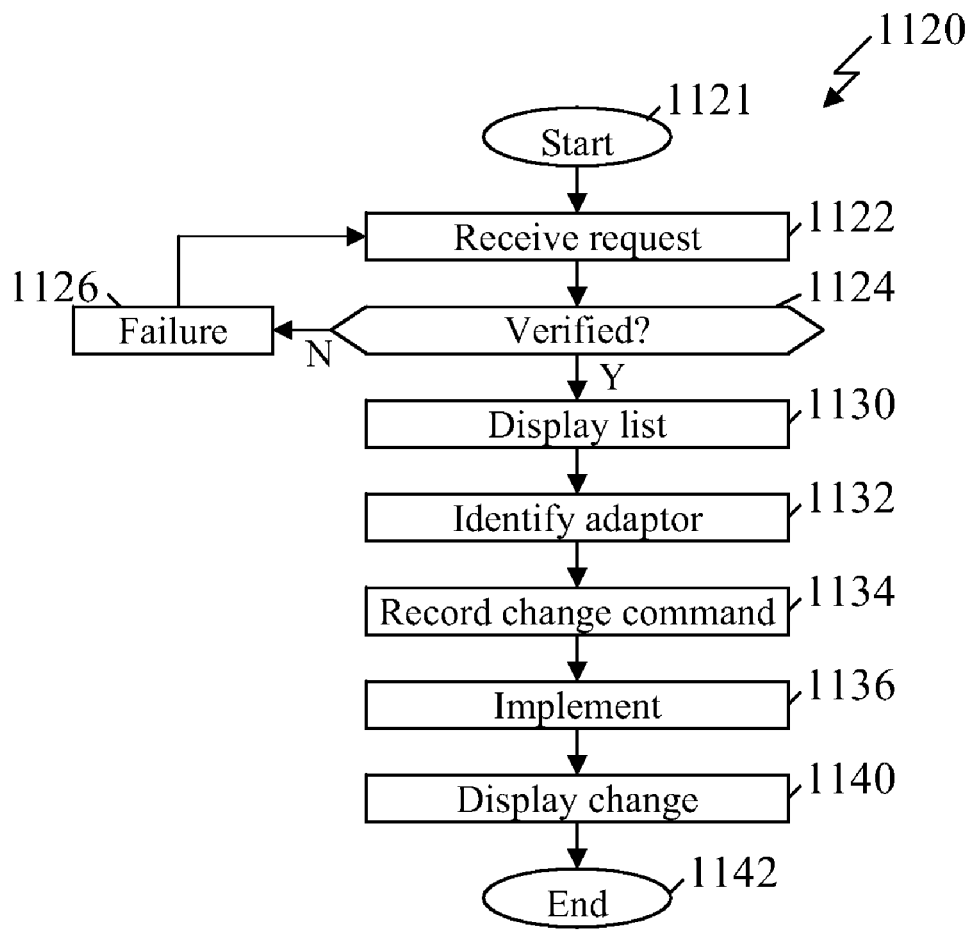
FIG. 11 depicts a simplified flow diagram of a process for use in remotely controlling one or more sensor adaptors and/ or PLC circuit breakers to control current flow to one or more consumer products of the local PLC network of FIG. 1.

FIG. 11 depicts a simplified flow diagram of a process 1120 for use in remotely controlling one or more sensor adaptors 132 and/or PLC circuit breakers to control current flow to one or more consumer products 140-143. The process 1120 starts at step 1121. In step 1122, a user request to control one or more sensor adaptors and/or PLC circuit breakers is received. In step 1124, it is determined whether proper security clearance is received. The security clearance can be determined through one or more methods such as, but not limited to, determining whether a request can be decrypted, whether a request includes a proper password, whether a request is received from an identified source (e.g., central controller 130, local computer 164, remote computer coupled with the distributed network 162), and other such methods or combinations of methods to determine security. When the security clearance is not verified the process continues to step 1126 where a failure reply is generated (e.g., displayed failure, audio notification of failure, or other reply), and the process 1120 returns to step 1122. In some implementations, the process 1120 returns to step 1122 from step 1126 a predefined number of times (e.g., twice, giving the user three opportunities to provide the correct clearance) and then terminates following predefined number of failures.

In step 1130, the user is provided with a list (e.g., displayed) of sensor adaptors and/or PLC circuit breaker. In step 1132, the process 1120 identifies which sensor adaptor(s) and/or PLC circuit breaker(s) is to be activated or deactivated according to received user commands. In step 1134, the change command is recorded. In step 1136, the requested change is implemented (e.g., activating a sensor adaptor). In step 1140, the user is notified of the status change (e.g., displaying "off" or "on" depending on the received command). The process 1120 terminates at step 1142.

The processes 820, 920, 1020 and 1120 above provide information to the user and/or receive commands, parameters and/or information from the user. In some embodiments, one or more user interfaces can be generated and displayed on the display 240, on the computer 164 and/or on remote devices (e.g., computer communicationally coupled with a distributed network, such as the Internet). These user interfaces allow a user to see information and parameters about the local PLC network, and in some implementations, allow users to make changes to the parameters and control the local PLC network 120. For example, some interfaces include entry fields that allow a user to select the field and enter parameter data into the field (e.g., threshold value entry fields). Similarly, the user interface can display selectable listings (e.g., listings of sensor adaptors, PLC circuit breakers and/or other devices of the network) that allow users to highlight or select one or more devices from the list. The selection can be implemented through the use of a mouse, stylist, arrow keys, or other pointing device, touch screen, keyboard number entry, remote control, and/or other such selection methods. Upon selection of one or more devices parameters, settings, past and/or current status information, and/or other relevant information can be provided to the user for the selected one or more parameters. The relevant information can, in some implementations, similarly be displayed, selectable and/or editable.

In some embodiments, a sensor adaptor 132 is identified upon initial connection with the local PLC network 120 by the sensor adaptor submitting a notification of its identification, submitting a request for an identification and/or the central controller 130 detecting the addition of the new sensor adaptor and issuing an identification. The identification can be generated, in some implementations, by the central control or a user. For example, upon an initial connection with the local PLC network, the central controller can detect the addition of a sensor adaptor and can request that a user define an identifier for the sensor adaptor (e.g., "cloths washing machine", "dishwasher", "heater", "computer", "TV" or other such identifiers). In some instances, the central controller can issue a default identification (e.g., a random number or other identifier, such as "sensor adaptor 015"), which can be used by the central controller and/or utilized until a user changes the identification. Using the identification, the central controller can issue commands, and/or properly associate and use information from the sensor adaptor.

The local PLC network 120 is configured such that the central controller 130 communicates over the local power lines 134, 136 with the sensor adaptors 132 and/or consumer products having sensor adaptor capabilities (e.g., consumer product 143). The central controller provides remote monitoring and/or control over the local PLC network 120. As described above, the central controller 130 receives runtime and/or history data from the one or more sensor adaptors 132, consumer products 140-143 and/or PLC circuit breakers 720 to track current and/or power usage of the consumer products, and provide a user with network conditions, usage and control. Additionally or alternatively in some embodiments, the central controller 130 can be partially or fully implemented through the computer 164 or other consumer product 140-143 having sufficient processing capabilities, controller software and/or firmware.

Some embodiments further include the network interface 160 that allows the transmission and/or reception of communications over one or more distributed networks 162. Additionally or alternatively, the computer 164 can include a network interface 166 that allows communication between the local PLC network 120 and the distributed network 162. Further in some implementations, the central controller 130 can communicate external to and/or from the local PLC network 120 through the external PLC network 150, for example, to an external network interface (not shown). Providing communication external to the local PLC network allows the central controller 130 to forward parameters, usage information and/or statistical information to users at remote locations and/or to other entities (e.g., tracking companies, security companies, and other such entities). Further, remote users can adjust parameters and/or forward control commands to the local PLC network 120 from remote locations. This gives users greater flexibility and/or control over the local PLC network. The communications to and/or from the local PLC network can be encrypted, verified or otherwise secured in attempts to avoid authorized access, control and/or use of the local PLC network 120. Additionally and/or alternatively, the central controller can allow threshold levels to be adjusted through the central controller (either directly at the central controller, or other device, such as through the computer) and the central controller can forward the threshold levels to the sensor adaptors where the sensor adaptors compare current usage levels to the thresholds and determine locally whether to interrupt current flow to the consumer product.

In some embodiments, the local PLC network additionally or alternatively includes one or more computers or other processor devices 164. The computer 164 can communicate over the local PLC with the network interface 160 and/or include a network interface 166 that allows communication with the distributed network 162. In some implementations, the network interface 160 can be replaced by the computer network interface 166 such that the central controller 130 can receive and transmit communications over the distributed network 162 through the computer network interface 166.

Further, the local PLC network allows a user greater control over consumer products and provides a user with information about the current level usage over the network. For example, a user can quickly check to see whether desired consumer products are on or off from a single location avoiding the need to go around checking each product. Further, users can learn the electricity usage of products to allow better energy saving efforts to conserve power and reduce costs. Further, employing the sensor adaptor allows a user to take advantage of the local PLC network and control consumer products without having to replace consumer products with PLC-ready products, and instead can continue to use existing consumer products. As such, the sensor adaptors and/or central controller allow a local PLC network to be quickly and easily implemented, at relatively low costs.

While the invention herein disclosed has been described by means of specific embodiments and applications thereof, numerous modifications and variations could be made thereto by those skilled in the art without departing from the scope of the invention set forth in the claims.

What is claimed is:

1. A local power line communication network, comprising:
 a central controller communicationally coupled with a local power line communication (PLC) power line;
 a sensor adaptor coupled between the local PLC power line and a consumer product, the sensor adaptor comprising:

a current detector that detects a current usage level passed through the sensor adaptor to the consumer product;

a PLC interface communicationally coupled with the local PLC power line, wherein the current usage level is communicated through the PLC interface and over the local PLC power line to the central controller; and an adaptor switch that is opened interrupting current flow to the consumer product in response to an interrupt command received over the local PLC power line from the central controller when current usage through the sensor adaptor has a predetermined relationship to a first threshold and is closed resuming current flow to the consumer product in response to a reconnect command received over the local PLC power line from the central controller while the switch is open;

wherein the central controller generates a warning message when the central controller determines that the current usage through the sensor adaptor has a predetermined relationship to a second threshold that is less than the first threshold.

2. The local PLC network of claim 1, wherein the sensor adaptor further comprises an adaptor controller coupled with the PLC interface, the current detector and the adaptor switch;

wherein the adaptor controller communicates, over the local PLC power line and through the PLC interface, with the central controller to transmit the current usage level through the sensor adaptor and receive the command to interrupt the current flow to the consumer product, and the adaptor controller activates the adaptor switch to interrupt the current flow to the consumer product in response to receiving the command to interrupt the current flow.

3. The local PLC network of claim 2, wherein the sensor adaptor further comprises a PLC coupler communicationally coupled with the local PLC power line, wherein the PLC coupler couples PLC signal data between the adaptor controller and the local PLC power line, and blocks AC power from the local PLC power lines from the adaptor controller.

4. The local PLC network of claim 1, wherein the sensor adaptor includes a plug to connect with an outlet of the local PLC power line, and a receptacle to receive a plug from the consumer product.

5. The local PLC network of claim 1, wherein the central controller comprises:

a PLC interface coupled with the local PLC power line; and a controller coupled with the PLC interface through which the controller receives the current usage level from the local PLC power line and through which the command to interrupt current to the consumer product is communicated from the controller to the local PLC power line when the controller determines that the current usage level has the predetermined relationship to the first threshold and the command to resume current flow to the consumer product is communicated from the controller over to local PLC power line.

6. The local PLC network of claim 5, wherein the central controller further comprises a user interface through which the controller receives user input and supplies local PLC network statistics.

7. The local PLC network of claim 1, further comprising:

a PLC circuit breaker coupled with the local PLC power line, the PLC circuit breaker comprising a breaker switch coupled with the local PLC power line that interrupts power to the local PLC power line when open, and a breaker PLC coupler coupled across the breaker switch maintaining a PLC signal path between the local PLC power line and another local PLC power line when the breaker switch is open.

8. The local PLC network of claim 7, wherein the PLC circuit breaker further comprises a breaker controller coupled with a PLC interface further coupled with the local PLC power line providing PLC communication between the breaker controller and the central controller to receive a breaker command from the central controller such that the breaker controller controls the opening of the breaker switch.

* * * * *